United States Patent Office 3,136,220
Patented June 9, 1964

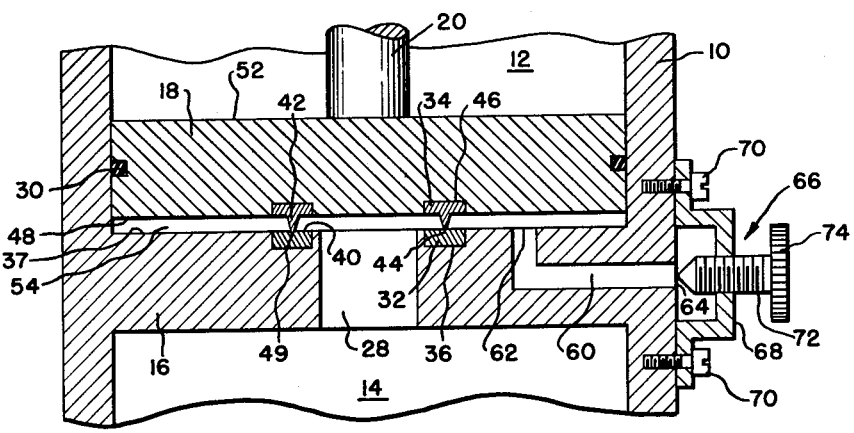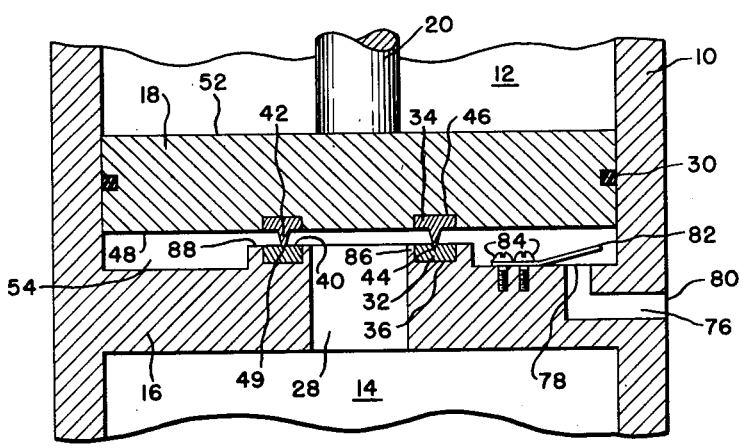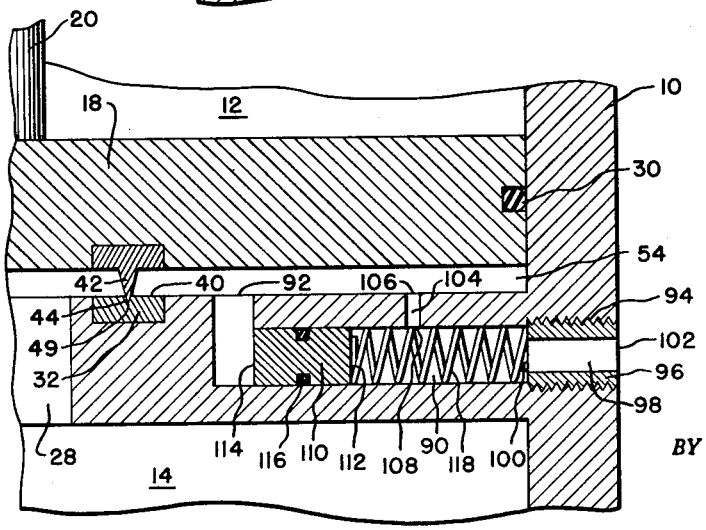

3,136,220
CONTROLLED HIGH ENERGY ACTUATOR
Lawrence J. Kamm, San Diego, Calif., assignor to General Dynamics Corporation, San Diego, Calif., a corporation of Delaware
Filed Apr. 12, 1961, Ser. No. 102,592
5 Claims. (Cl. 91—165)

This invention relates generally to actuator apparatus, and more particularly, it relates to a novel actuator which produces controllable, rapidly applied thrust loads.

The present invention represents improvements upon actuators described and claimed in the copending application of Jack Benton Ottestad, Serial No. 617,014, filed October 19, 1956 now Patent No. 2,979,938.

In the actuators of the above copending application, a setting pressure urges an actuator piston toward an orifice wall and causes a resilient sealing element to effect a positive pressure seal about the orifice between the wall and the piston. An actuating pressure is applied through the orifice upon a portion of the piston within the seal until it overbalances the force of the setting pressure and moves the piston from the orifice wall. This eliminates the seal and releases the actuating pressure upon an area of the piston outside the seal.

The actuators of the above copending application are characterized by certain limitations and shortcomings. Among these are that pressure seals utilized therein are fashioned from resilient materials, such as rubber, and are subject to wear or deterioration through continued use, thus requiring replacement if the required positive pressure sealing is to be maintained between the piston and the orifice member. This involves a complete breakdown of the actuator, which is both time consuming and expensive, and renders the actuator idle for large periods of time. Another important limitation is that as the resilient seal wears or deteriorates, it can no longer serve as a positive seal between the piston and the wall, thus allowing the high actuating pressure to act on the area of the piston outside the seal, which causes a premature or uncontrollable working stroke of the piston.

In overcoming the foregoing limitations and in achieving its objects and advantages, the novel actuator of the present invention utilizes an actuator piston which is positioned to confront an orifice wall member. The actuator piston and the wall member cooperate to provide a durable, though imperfect or impositive actuating pressure seal about the orifice. The actuator piston is urged by a set force on setting pressure fluid into engagement with the orifice wall member to establish the pressure seal. An actuating pressure fluid is applied through the orifice upon a portion of the piston within the seal until it overbalances the force of the setting pressure fluid and moves the piston from the orifice wall member to eliminate the pressure seal and allow the actuating pressure fluid to act upon an increased area of the piston outside the seal. While the actuating pressure fluid acts to overbalance the force of the setting pressure fluid, pressure on the area of the piston outside the seal due to leakage of the actuating pressure fluid past the imperfect actuating pressure seal is relieved by a pressure relief means which discharges the leaked actuating pressure fluid.

The novel arrangement of the present invention provides valuable results. An important advantage is that since durable orifice sealing is provided, time consuming and expensive disassembly of the actuator to replace a worn resilient seal of the type revealed in the above copending application is avoided. Another important advantage is that by relieving the pressure of the actuating pressure fluid which has leaked past the durable seal to act on the area of the actuating piston outside the seal, a premature or uncontrolled working stroke of the actuating piston is prevented. Improved controlled output therefore results.

It is therefore an object of the present invention to provide an improved actuator which is capable of providing controlled output thrust.

It is an object of the present invention to provide a novel actuator which is capable of operating with very little maintenance.

An object of the present invention is to provide an actuator incorporating a novel actuating pressure seal which is durable and avoids the necessity of disassembly of the actuator to replace.

It is an object of the present invention to provide an actuator utilizing a novel actuating pressure seal which minimizes leakage of actuating pressure fluid upon an actuator piston prior to the working stroke of the actuator.

An object of the present invention is to provide an actuator utilizing novel means for preventing premature operation of the actuator due to leakage of actuating pressure fluid upon an actuator piston prior to the working stroke of the actuator.

Another object of the present invention is to provide an actuator incorporating novel pressure relief means which relieves the pressure of leaked actuating pressure fluid upon an actuator piston prior to the operating stroke of the actuator and prevents premature operation of the actuator.

It is another object of the present invention to provide an actuator incorporating novel pressure relief means which is adjustable and relieves the pressure of leaked actuating pressure fluid upon an actuator piston prior to the operating stroke of the actuator, and prevents premature operation of the actuator.

It is an object of the present invention to provide an actuator utilizing novel pressure relief means which is capable of discharging actuating pressure fluid which has leaked upon an actuator piston prior to the operating stroke of the actuator to prevent premature operation of the actuator, and automatically limits discharge of the actuating pressure fluid during the working stroke of the actuator.

Other objects of the present invention will be readily apparent to those skilled in the art from the following description and drawings in which:

FIGURE 2 is an elevational view partly in cross-section, of a fragmentary portion of the actuator of FIGURE 1 showing an adjustable form of pressure relief means;

FIGURE 3 is an elevational view of an actuator similar in some respects to the actuator of FIGURE 1 and incorporating another form of pressure relief means which is automatic; and FIGURE 4 is an enlarged elevational view, partly in cross-section, of a fragmentary portion of the actuator of FIGURE 1, embodying still another form of automatic pressure relief means.

Figure 1:
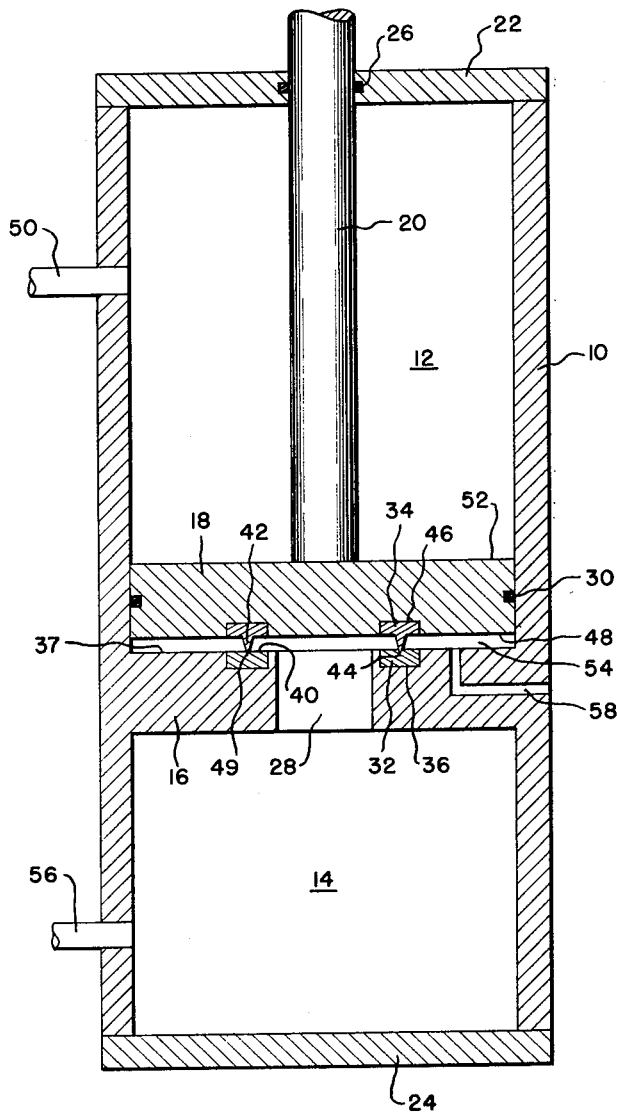
FIGURE 1 is an elevational view, partly in cross-section, of the actuator of the present invention showing one form of pressure relief means.

Referring to FIGURE 1 of the drawings, there is represented one embodiment of the actuator of the present invention capable of producing rapidly applied output thrusts. The actuator comprises a cylinder designated by the numeral 10 which includes pressure chambers 12 and 14. A wall member 16 separates the chambers 12 and 14. Slidably positioned within pressure chamber 12 is a piston 18 to which is connected a thrust column 20, which serves to transmit energy developed by the piston 18 to a member (not shown). Cylinder 10 is closed at one end by end member 22 and at the other end by an end member 24. The thrust member 20 is arranged to extend through end member 22 which carries a packing ring 26 in a suitable groove to provide a pressure seal about the movable thrust member 20. The material utilized in forming cylinder 10, as well as end members 22 and 24, must be strong enough to withstand the loads produced by the working pressures in chambers 12 and 14. Cylinder 10 and end members 22 and 24 are preferably formed from metal such as steel, aluminum or the like. However these elements may be made of plastic material where the pressures utilized within chambers 12 and 14 are within the limits that the plastic elements can withstand.

Wall member 16 includes an aperture or orifice 28. Wall member 16 is fixedly supported within cylinder 10 by suitable means such as brazing or welding, or it could be cast into the cylinder or otherwise included as an integral part of the cylinder 10. Wall member 16 is fabricated of material capable of withstanding the loads produced by the pressure within chamber 14.

Piston 18 is fabricated from a material capable of withstanding any applied loads without buckling or rupturing and is arranged for translational movement within pressure chamber 12. Piston 18 carries a packing ring 30 within a suitable groove.

An arrangement consisting of annular members 32 and 34 provides a means for effecting a durable imperfect pressure seal between the piston 18 and the wall member 16 around the orifice 28. The member 32 is preferably fashioned from soft durable material, such as brass or soft iron, or the like. It is positioned, as as by force-fit, in a circular groove 36 of rectangular cross-section formed in the upper surface 37 in the wall member 16 around the orifice 28.

The member 34 is preferably fashioned from hard durable material, such as hardened tool steel, or the like, and has a narrow circular ridge 42 of V-shaped cross section defining a sharp circular edge 44. The member 34 is adapted to be positioned in a circular groove 46 having a rectangular cross section in the under-surface 48 of the piston 18, as by force-fit, such that the sharp edge 44 is adapted to engage the upper surface 40 of member 32 to embed therein to form a groove 49 and pressure sealing when the piston is in its lowermost position, as will hereinafter be more fully explained.

A conduit 50 is provided in the cylinder 10 and interconnects a source of fluid pressure (not shown) with chamber 12 to provide fluid pressure on the upper surface 52 of the piston 18 to urge the piston toward the wall member 16. The fluid pressure may be air, nitrogen or other compressible gas. As shown in FIGURE 1, a space 54 is formed when the piston is in the lowermost position. Means for applying a force to the portion of undersurface 48 of piston 18 exposed by the orifice 28 is provided in the form of relatively high fluid pressure established in chamber 14 by a conduit 56 interconnected to a source of fluid pressure (not shown).

A pressure relief means which consists of a fluid passage 58 is provided in wall member 16 and interconnects the space 54 to the exterior of the cylinder 10. The passage 58 is of such optimum size as to offer low resistance to flow of the fluid leaking past the seal, and high resistance to flow of the high pressure actuating fluid when it acts over an increased area of the undersurface 48 of the piston 18, for a purpose to be hereinafter more fully explained in the description of operation of the actuator of FIGURE 1.

In operation of the device of FIGURE 1, low pressure air, for example, is introduced into chamber 12 through the conduit 50 on the upper surface 52 of the piston 18, forcing the edge 44 against the member 32 to form the pressure seal around the orifice 28. High pressure actuating air is then introduced into chamber 14 through conduit 56 to exert a counter force on the piston 18 through the orifice 28 against the portion of the undersurface 48 of the piston 18 exposed by the orifice. Since the area of the exposed portion of the undersurface 48 is smaller than the area of the upper surface 52 of the piston 18, a net force results which presses the edge 44 against member 32 until the pressure of the actuating air in chamber 14 reaches a critical value, at which time the force on the exposed portion of the undersurface 48 exceeds the force on surface 52. When this critical pressure is attained, edge 44 separates from member 32, the high pressure actuating air enters space 54 and is applied over an increased area of the undersurface 48 of the piston. This produces a large net force on the piston 18 and it accelerates at a high rate in the upward direction.

Since abutment of edge 44 and member 32 produces an impositive or imperfect seal, air will leak into the space 54 while the pressure is being built up in chamber 14. If uncontrolled, the pressure of leaked air on the increased area of undersurface 48 would cause premature motion of the piston 18 before the desired pressure level is reached in chamber 14. However, in the actuator of FIGURE 1, since the passage 58 has a low resistance to the flow of air which has leaked into space 54, the air is allowed to vent or discharge freely to the atmosphere surrounding the exterior of cylinder 10, thus relieving pressure on the increased area of undersurface 48 due to the leakage of air, and preventing undesired premature motion of the piston 18. Subsequently when the force exerted on the upper surface 52 of the piston by the low pressure air in chamber 12 has been overcome or unbalanced by the high pressure actuating air acting on the exposed area of the piston undersurface 48 to break the seal and allow the high pressure air to act over the increased area of undersurface 48, serious loss of the high pressure air is prevented since the passage 58 offers high resistance to flow of this air.

Referring to FIGURE 2, there is revealed another embodiment of the present invention which is similar to that of FIGURE 1 except that there is provided an adjustable pressure relief means for selectively varying the resistance of a passage to flow of fluid to vent leaked fluid to atmosphere, and to limit the loss of high pressure actuating fluid. In this embodiment a passage 60 having an inlet 62 and outlet 64 connects the space 54 to the exterior of cylinder 10. A needle valve arrangement generally indicated by the numeral 66 consists of a support member 68 suitably positioned on the cylinder 10 as by screws 70. The support member carries a needle 72 in threaded engagement therewith and in axial alignment with respect to the outlet 64. A manually adjustable knob 74 on one end of the needle provides a means for regulating the position of the other end of the needle with respect to outlet 64 to thereby selectively control the size of the outlet 64, and accordingly the resistance to flow of fluid through the passage 60.

The operation of the device of FIGURE 2 is similar to that of the device revealed in FIGURE 1, except that the resistance of the fluid flow path defined by the passage 60, can be manually adjusted to an optimum value by positioning the needle 72 with respect to the outlet 64 of passage 60 to provide low resistance to flow of the air which had leaked into space 54 to the exterior of the cylinder 10, and high resistance to flow of the high pressure actuating air.

Referring to FIGURE 3, wherein there is shown still a further embodiment of the invention incorporating a flow rate pressure relief means providing a low resistance venting fluid flow path to leaked air, and automatically limiting loss of high pressure air. In FIGURE 3 there is shown a passage 76 having an inlet 78 and outlet 80 offering low resistance to the flow of air which has leaked into space 54 to the exterior of cylinder 10. In order to provide high resistance to the high pressure actuating air an automatic valve arrangement comprising a flat thin leaf spring 82 is positioned on the wall member 16, as by screws 84, such that it overlaps the inlet 78 to passage 76 in spaced relationship therewith. To provide for adequate accommodation of the leaf spring within space 54 a raised annular portion 86 which carries the annular member 32 in its upper surface 88 is provided. The leaf spring 82 is fashioned from resilient metal so as to provide bending of the leaf spring to cover the inlet 78 when air flows therebetween at a great rate, as will hereinafter be more fully described.

The operation of the device of FIGURE 3 is as follows: Low pressure air is introduced in chamber 12, as in the embodiments of FIGURES 1 and 2, to apply a force on piston 18 and move it toward the wall member 16 to effect the impositive seal defined by edge 44 and member 32. Next the high pressure actuating air is introduced into chamber 14 to overbalance the force on the upper surface 52 of the piston 18 to break the seal and allow the high pressure actuating air to act over an increased area of the undersurface 48. Since the resistance of passage 76 to flow of fluid is low, the air leaking past the seal into space 54 prior to the overbalancing of the force on the upper surface 52 of the piston vents at a low rate around the leaf spring 82 and through the passage 76 to the exterior of the cylinder 10 without disturbing the leaf spring. However, when the force on the upper surface 52 is overbalanced, and the high pressure actuating air acts over the increased area of the undersurface 48 of the piston to move it rapidly, the high pressure actuating air in space 54 starts to move past leaf spring 82 into passage 76 at a very great rate. The fast moving air causes the leaf spring to bend and cover the inlet 78 to passage 76 thereby restricting further movement of air therethrough. When this occurs the pressure in space 54 is the full pressure exerted by the high pressure actuating air, while the pressure in the passage 76 is equal to the pressure exerted by the atmosphere surrounding the cylinder 10. The difference between these pressures maintains leaf spring 82 against the inlet 78 of passage 76 until the stroke of the piston 18 in the upward direction is completed and the pressure in space 54 is relieved in preparation for the next stroke of the piston.

Still another embodiment of the invention incorporating automatic pressure relief means, is illustrated in FIGURE 4. Here a passage 90 having an inlet 92 and outlet 94 interconnects the space 54 with the exterior of cylinder 10. An insert plug 96 is threadedly positioned in the outlet 94 of passage 90 and has a passage 98 therethrough with an inlet 100 opening into passage 90 and an outlet 102 to the exterior of cylinder 10. Another passage 104 is provided which connects the space 54 and the passage 90, and has an inlet 106 opening into space 54 and an outlet 108 opening into passage 90 intermediate the inlets 92 and 100. The passage 104 is of such size as to offer low resistance to flow of fluid present in space 54 resulting from leakage of high pressure actuating fluid past the seal, as defined by edge 44 and member 32, and high resistance to flow of the actuating fluid when it acts on the piston during the working stroke of the actuator. The passages 90 and 98 are dimensioned to offer low resistance to flow of both the leaked fluid and the actuating fluid.

A movable plug 110 having surfaces 112 and 114 is positioned within passage 90 for sliding movement therein, and carries a sealing ring 116 to provide a pressure seal thereabout. A helical spring 118 is also positioned within the passage 90, and has one end bearing against the surface 112 of the movable plug 110 and the other end against the insert plug 96 to serve as a biasing means for applying a force on the movable plug 110 to urge it away from the outlet 108, as shown.

The operation of the embodiment shown in FIGURE 4 is as follows: Low pressure air is introduced into chamber 12 to effect the seal, as defined by edge 44 and member 32. High pressure actuating air is then introduced into chamber 14, as in the embodiments hereinbefore described. Some of the high pressure air leaks past the seal into space 54 while acting to overbalance the force exerted by the air pressure in chamber 12, but is allowed to vent freely through the path defined by passages 104, 90, and 98 to the exterior of cylinder 10, since the path offers low resistance to the flow of leaked air. The leaked air also seeks exit through inlet 92 of passage 90 to exert a force against surface 114 of the plug 110, but is prevented from moving the plug due to the reactive force of spring 118.

When the force exerted by the low pressure air in chamber 12 on piston 18 is overbalanced by the high pressure air of chamber 14, the seal is broken, and the high pressure air enters space 54 to rapidly apply force to move the piston. Since passage 104 offers high resistance to flow of this high pressure air, a large pressure drop is obtained between space 54 and passage 90 resulting in a very little pressure force developed on surface 112 of plug 110. But, since passage 90 offers low resistance to the flow of the high pressure air through inlet 92, the full force of the high pressure air is developed over the surface 114 of the plug, which overcomes the pressure force on surface 112 and the reactive force of spring 118 to move the plug to close outlet 108 of passage 104, thus stopping further loss of high pressure air to the exterior of cylinder 10. When the high pressure air is relieved in space 54, spring 118 restores the plug 110 to its initial position, as shown, in preparation for the next stroke of the piston 18.

Although specific embodiments of the present invention have been described and illustrated in detail, it is to be clearly understood that the same are by way of illustration and example only; it is to be understood that the invention is not limited thereto, as many variations will be readily apparent to those versed in the art and the invention is to be given its broadest possible interpretation with the terms of the appended claims.

What I claim is:

1. An actuator comprising housing means having a wall member with an orifice therein, a movable piston positioned within said housing means and having an undersurface facing said wall member, a thrust member coupled to said piston and arranged to transmit energy developed by said piston, means for applying a fluid pressure force on said piston to urge said piston toward said wall member, means providing a seal between said piston undersurface and said wall member to surround said orifice and to define an area of said undersurface exposed through said orifice and an increased area of said undersurface, said seal, wall member and increased area of said undersurface defining a space, means for applying a pressure fluid to exert pressure through said orifice on said exposed undersurface area to overbalance said fluid pressure force and to eliminate said seal and allow said pressure fluid to act over said increased undersurface area, fluid path means within said wall member interconnecting said space and the exterior of said housing means, said fluid path means having low resistance to flow of said pressure fluid leaking past said seal while said pressure fluid is applied to overbalance said force to prevent premature activation of the actuator, and means within said housing means and responsive to the pressure of said pressure fluid for closing said fluid path means to block flow of said pressure fluid therethrough while said pressure fluid acts over said increased undersurface area.

2. An actuator as set forth in claim 1, said fluid path means comprising a fluid passage having an inlet opening into said space and an outlet opening to the exterior of said housing means.

3. An actuator as set forth in claim 2, said pressure responsive means comprising a leaf spring mounted on said wall member within said space and having a portion in overlapping spaced relationship with said fluid passage inlet.

4. An actuator comprising housing means having a wall member with an orifice therein, a movable piston positioned within said housing means and having an undersurface facing said wall member, a thrust member coupled to said piston and arranged to transmit energy developed by said piston, means for applying force on said piston to urge said piston toward said wall member, means providing a seal between said undersurface and said wall member to surround said orifice and to define an area of said undersurface exposed through said orifice and an increased area of said undersurface, said seal, wall member and increased area defining a space, means for applying a pressure fluid to exert pressure through said orifice on said exposed undersurface area to overbalance said force and to eliminate said seal and allow said pressure fluid to act over said increased undersurface area, a first passage in said wall member having an inlet opening into said space and an outlet opening to the exterior of said housing means, an insert plug positioned in said first passage outlet, said plug having a second passage with an inlet opening into said first passage and an outlet opening to the exterior of said housing means, a third passage in said wall member having an inlet opening into said space and an outlet opening into said first passage intermediate said first and second passage inlets, said passages having low resistance to flow of said pressure fluid leaking past said seal while said pressure fluid is applied to overbalance said force to prevent premature activation of the actuator, said third passage having high resistance to flow of said pressure fluid while said pressure fluid acts over said increased undersurface area, and means within said first passage and responsive to the pressure of said pressure fluid for closing said third passage outlet to block flow of said pressure fluid therethrough while said pressure fluid acts over increased undersurface area.

5. An actuator as set for in claim 4, said pressure responsive means comprising a movable plug slidably positioned within said first passage intermediate said first passage inlet and said third passage outlet, and a helical spring positioned within said first passage having one end bearing against said insert plug and the other end against said movable plug.

References Cited in the file of this patent

UNITED STATES PATENTS

| | | |
|---|---|---|
| 571,833 | Hunter | Nov. 24, 1896 |
| 2,932,951 | Ottestad et al. | Apr. 19, 1960 |
| 2,979,938 | Ottestad | Apr. 18, 1961 |
| 3,071,116 | Smallpiece | Jan. 1, 1963 |

FOREIGN PATENTS

| | | |
|---|---|---|
| 153,198 | Great Britain | Nov. 4, 1920 |
| 849,253 | Great Britain | Sept. 21, 1960 |
| 833,581 | France | July 25, 1938 |
| 1,196,263 | France | May 25, 1959 |